(12) United States Patent
Tabatabai et al.

(10) Patent No.: US 7,934,008 B2
(45) Date of Patent: Apr. 26, 2011

(54) DELIVERY OF MULTIMEDIA DESCRIPTIONS USING ACCESS UNITS

(75) Inventors: Ali J. Tabatabai, Cupertino, CA (US);
Toby Walker, San Jose, CA (US);
Mohammed Zubair Visharam, Santa Clara, CA (US); Hawley K. Rising, III, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2927 days.

(21) Appl. No.: 10/038,142

(22) Filed: Oct. 22, 2001

(65) Prior Publication Data

US 2002/0159519 A1 Oct. 31, 2002

Related U.S. Application Data (60) Provisional application No. 60/272,729, filed on Mar. 1, 2001, provisional application No. 60/304,864, filed on Jul. 11, 2001, provisional application No. 60/260,949, filed on Jan. 10, 2001, provisional application No. 60/242,378, filed on Oct. 20, 2000, provisional application No. 60/269,527, filed on Feb. 16, 2001, provisional application No. 60/274,137, filed on Mar. 7, 2001.

(51) Int. Cl.
*G06F 15/16* (2006.01)

(52) U.S. Cl. ........ 709/231; 709/201; 707/793; 707/798; 707/795; 345/619; 345/629; 345/632; 715/723; 725/135

(58) Field of Classification Search .................. 709/231, 709/201–203, 200; 707/793, 798, 795; 345/619, 345/629, 632; 715/723; 725/135
See application file for complete search history.

(56) References Cited

U.S. PATENT DOCUMENTS

| | | | |
|---|---|---|---|
| 5,579,471 A | 11/1996 | Barber et al. | |
| 6,392,654 B1 * | 5/2002 | Gallotta et al. | 345/503 |
| 6,492,998 B1 | 12/2002 | Kim et al. | |
| 6,538,673 B1 * | 3/2003 | Maslov | 715/853 |
| 6,549,922 B1 * | 4/2003 | Srivastava et al. | 707/205 |
| 6,593,936 B1 * | 7/2003 | Huang et al. | 345/619 |
| 6,693,645 B2 * | 2/2004 | Bourges-Sevenier | 345/619 |
| 6,748,569 B1 * | 6/2004 | Brooke et al. | 715/523 |
| 6,751,623 B1 * | 6/2004 | Basso et al. | 707/101 |
| 6,847,980 B1 * | 1/2005 | Benitez et al. | 707/104.1 |
| 6,934,906 B1 * | 8/2005 | Cheok | 715/500.1 |
| 6,964,009 B2 * | 11/2005 | Samaniego et al. | 715/501.1 |
| 6,966,027 B1 * | 11/2005 | Krasinski | 715/513 |
| 7,120,863 B1 * | 10/2006 | Wang | 715/513 |
| 7,143,434 B1 * | 11/2006 | Paek et al. | 725/142 |
| 7,165,073 B2 * | 1/2007 | Vandersluis | 707/102 |
| 2002/0036639 A1 * | 3/2002 | Bourges-Sevenier | 345/474 |
| 2002/0090029 A1 | 7/2002 | Kim | |
| 2002/0101431 A1 * | 8/2002 | Forney et al. | 345/582 |

(Continued)

OTHER PUBLICATIONS

ISO/IEC JTC1/SC29/WG11 N3575.*

(Continued)

*Primary Examiner* — William C. Vaughn, Jr.
*Assistant Examiner* — Greg Bengzon
(74) *Attorney, Agent, or Firm* — Blakely, Sokoloff, Taylor & Zafman LLP (57) ABSTRACT

The invention relates to encoding and decoding descriptions of multimedia content in two formats using access units. The invention further relates to dynamically updating multimedia description using access units and to supporting the delivery of distributed multimedia descriptions.

90 Claims, 9 Drawing Sheets

U.S. PATENT DOCUMENTS

| | | |
|---|---|---|
| 2002/0143972 A1 | 10/2002 | Christopoulos et al. |
| 2003/0014397 A1* | 1/2003 | Chau et al. .................... 707/3 |
| 2004/0163045 A1* | 8/2004 | Hui et al. ..................... 715/513 |
| 2006/0167876 A1* | 7/2006 | Benitez et al. ................ 707/7 |

OTHER PUBLICATIONS

MPEG-7 Behind the Scenes, D-Lib Magazine Sep. 1999, Jane Hunter, Distributed Systems Technology Centre University of Queensland.*

W3C Issues XSL Transformations (XSLT) and XML Path Language (XPath) as Recommendations, Press Release dated Nov. 16, 1999.*

'Extensible MPEG-4 Textual format (XMT)', Michelle Kim, Steve Wood, Lai-tee Cheok, ACM Multimedia Workshop, 2000.*

ISO/IEC JTC 1/sc 29/WG 11, Oct. 19, 2000 ISO/IEC 14496-1:2001(E) (Systems) Document #: N3850 (This document integrates IDS/IEC 14496-1:1999 (N2501), COR1 (N3278), and AMD1 (N3054).) Cover sheet, pp. 2, 8, 9, 10, 11, 57 & 58.

* cited by examiner

DELIVERY OF MULTIMEDIA DESCRIPTIONS USING ACCESS UNITS

RELATED APPLICATIONS

This application claims the benefit of U.S. Provisional Application Nos. 60/272,729, filed Mar. 1, 2001, 60/304,864 filed Jul. 11, 2001, 60/260,949, filed Jan. 10, 2001, 60/242,378, filed Oct. 20, 2000, 60/269,527 filed Feb. 16, 2001 and 60/274,137 filed Mar. 7, 2001, the above applications herein incorporated by reference.

FIELD OF THE INVENTION

This invention relates generally to transmitting data. More specifically, the invention relates to mechanisms and techniques that enable data related to multimedia content descriptions to be encoded and transmitted.

NOTICE OF COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2000, Sony Electronics, Inc., All Rights Reserved.

BACKGROUND OF THE INVENTION

Digital multimedia information is becoming widely distributed though broadcast transmission, such as digital television signals, and interactive transmission, such as the Internet. The information may be in still images, audio feeds, or video data streams. The Moving Picture Experts Group (MPEG) has promulgated a Multimedia Content Description Interface, commonly referred to as MPEG-7, to standardize the description of multimedia information when it is transmitted from a system that generates the information to a system that uses the information.

MPEG-7 defines a generic structure for describing multimedia content. For example, the structure for a standard movie could include scenes, shots within scenes, titles for scenes, and time, color, shape, motion, and audio feature information for shots. The corresponding description would contain a "descriptor" component that describes features of the content, such as color, shape, motion, frequency, title, etc., and a "description scheme" component that describe relationships among two or more descriptors, e.g., a shot description scheme that relates together the features of a shot. For example, Fourier descriptors and polygon vertices are representations, or descriptors for a shape feature. A description scheme can also describe the relationship among other description schemes and between description schemes and descriptors, e.g., a scene description scheme that relates the different shots in a scene and relates the title of the scene to the shots.

The structure and format of an MPEG-7 content description is defined by a schema using a Description Definition Language (DDL), which is designed to define descriptors and description schemes. For each descriptor, the schema specifies the syntax and semantics of the corresponding feature. For each description scheme, the schema specifies the structure and semantics of the relationships among its children components, which are descriptors and description schemes. The DDL for MPEG-7 multimedia content is based on the XML (extensible markup language) and the XML Schema standards. The descriptors, description schemes, semantics, syntax, and structures of the content description are represented with XML elements and XML attributes. Some of the XML elements and attributes may be optional.

A multimedia content description is encoded in an XML "instance document" that references the appropriate schema and is an instance of the schema defined in DDL; that is, it contains data that adheres to the syntax and semantics defined in the DDL schema. The instance document contains a set of "descriptor values" for the required elements and attributes in the schema and for any necessary optional elements and/or attributes. An instance document is transmitted from a system having or generating the description data, through a communication channel such as a computer network, to another system that will a consume the multimedia content description data contained in the instance document.

When transmitting a multimedia description represented in XML it possible to send the data in either textual form or to encode the XML data into another binary form, such as the binary format specified for MPEG-7 data, known as "BiM".

Figure 1:
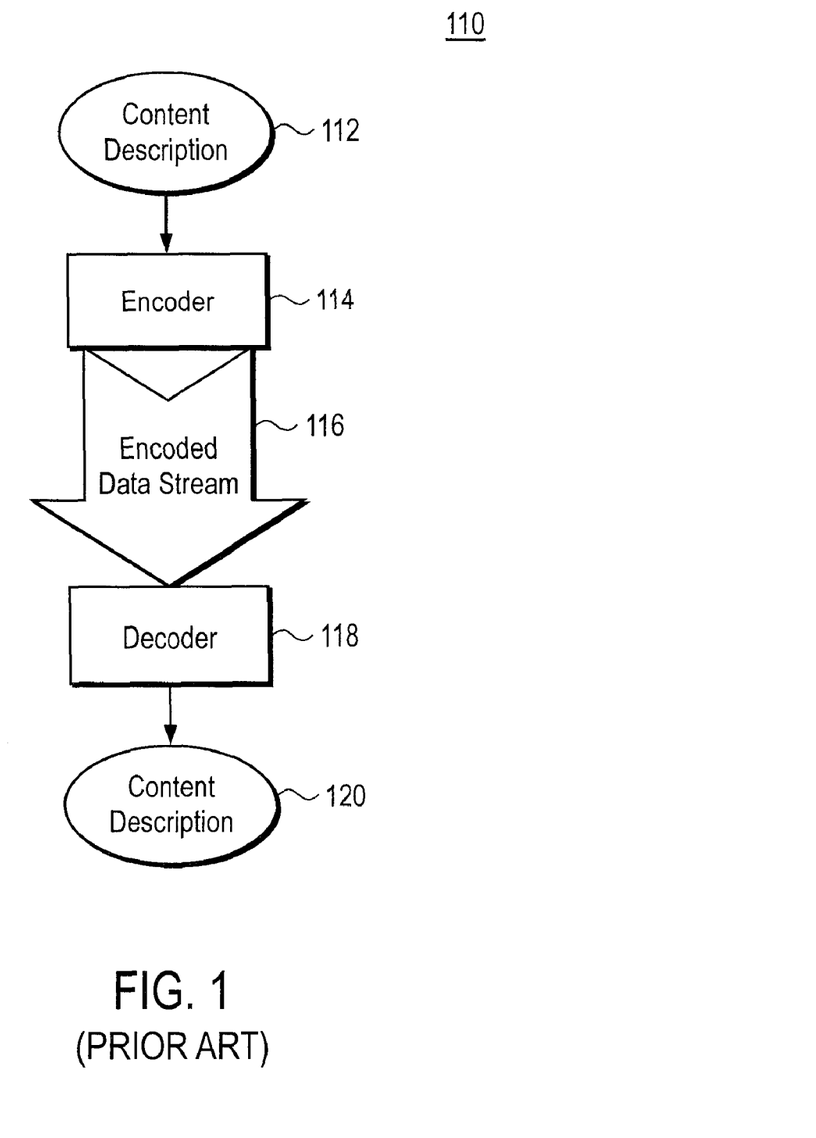
FIG. 1 is prior art and illustrates an example of transmitting a description from an encoder to a decoder.

FIG. 1 illustrates one example of transmitting a multimedia document. In system 110, content description 112 is a multimedia description, for example a description of a movie. Encoder 114 encodes content description 112 in a format suitable for transmission. After encoding, encoded data stream 116 represents the encoded form used for transmitting content description 112 to decoder 118 over some communication channel (not shown). Decoder 118 receives encoded data stream 116 and uses it to reconstruct content description 120, which is the same as content description 112. Encoder 114 may use various methods to form the encoded data used to transmit content description 112.

While various means may be used by encoder 114 to transmit encoded data stream 116 to decoder 118, normally the description data must be sent as a encoded data stream over a communication channel, such as a network communication channel using a communications protocol like TCP/IP. Although compression can reduce transmission time by decreasing the size of the encoded stream, if the description is large, transmitting the entire description over a network can still take too much time. Rather than sending the entire description, the encoder may send parts of the description to the encoder. The method for determining which parts to send is not the subject of this invention and is application dependent. Herein, the term "description fragment" means a part of a description.

The content description 112 may be either static or dynamic. A static description is one that does not change during the duration of communication between encoder 114 and decoder 118. A dynamic description is one in which the description data 112 is changed during the duration of the communication between encoder 114 and decoder 118. This change must be reflected in the description data 120. Description data 112 is changed when data pertaining to the multimedia content is added, deleted, or changed. For example, if the description pertains to a scene being captured by a camera the description may change if an object appears or disappears from the scene. Additionally, if the description is about a television program, portions of the data may be updated, e.g. the broadcast time of the program may changes, and such changes sent from the encoder to decoder. When the description is dynamic it is more efficient to send only updates to the encoder rather the resending the entire changed description.

Furthermore, in a distributed environment, description data is spread across multiple hosts and each host contains only a part of a complete description. If all description fragments (i.e., parts of the description) are streamed from a single encoder, then the encoder spends a significant amount of time and resources in gathering all the description fragments.

SUMMARY OF THE INVENTION

One embodiment is a method comprising the following process: form an access unit comprising a fragment update, where the fragment update comprises a fragment update command; form an encoded data stream from the access unit.

DETAILED DESCRIPTION

In the following description, numerous specific details such as specific materials, processing parameters, processing blocks, etc., are set forth in order to provide a though understanding of the invention. One skilled in the art will recognize that these details need not be specifically adhered to in order to practice the claimed invention. In other instances, well known processing blocks, materials, etc., are not set forth in order not to obscure the invention. Furthermore, different embodiments of this invention may use different syntaxes for encoding substantively the same information. For example, the use of different names, attributes, elements to form alternative embodiments of this invention will be will be obvious to one well-versed in the art.

This invention provides an efficient method to deliver MPEG-7 description data from an encoder to a decoder using access units, a method for configuring a system to receive access units, and a method for using access units for communication of distributed multimedia content description. Furthermore, the invention is not limited to MPEG-7 multimedia description and may also be applied to any structured data represented using XML.

When sending a description from a decoder to an encoder, the description is usually divided into pieces that are sent to a decoder one after another. In the following, "access unit" is used to refer to the smallest unit for transmitting a part of a description from an encoder to a decoder across a communication channel or inside a stream. The term is chosen because the access unit is the smallest unit for a decoder accessing a description. When transmitting a description the encoder divides the description into fragments, encodes these as access units, and sends access units to the decoder where they are used to reconstruct the description.

The description tree, defined in detail later, is a representation of hierarchical structure of elements, attributes, text values and so on, that make up an instance document. A "fragment" is an arbitrarily connected component of the description tree that is not necessarily complete with respect to a schema definition, such as MPEG-7 DDL. In other words, a fragment is a sub-tree of the description tree.

An encoded transmission format typically provides information pertaining to the method of encoding transmitted data. For example, encoder 114 sends information about the encoded data stream 116 to the decoder. Such information may be sent over the same communication channel or stream (e.g. "in-band") or "out-of-band"; that is, on a separate communication channel from that used for sending the encoded description stream. An encoder provides information about the resources needed for decoding so that a decoder can correctly decode an instance document. Information about resources needed for decoding allows a system to determine if the needed resources are present and available, and if not then to send a command to stop transmission. One method of providing resource information is to send a global element with information (e.g., MPEG7_DecoderConfig) at the beginning of a session.

When the description data is transmitted or streamed, for example when a description is broadcast, a decoder needs to determine a correct beginning point within encoded data stream. To do so the encoded data typically has synchronization points. Synchronization points are points in the encoded data stream where a decoder can form an initial state, start decoding, and then properly decode subsequent encoded data.

Synchronization points enable random access to the encoded stream of description data. This is analogous to the "I-Frame" used in video compression standard, such as the MPEG-1 and MPEG-2 standards. Such access points are associated with a partial description, or sub-tree, where a decoder can access only a part of the entire description. Such sub-trees must be semantically meaningful points. That is, they must be sub-tree that is an instance of a descriptor, description scheme, or datatype defined by the MPEG-7 standard schema. Such semantically meaningful points may be defined as MPEG7Unit.

Another example of a synchronization point is a reset point that contains a fragment that forms a complete description with respect to the schema, for example MPEG7Main, a complete, independent, descriptive entity.

In some cases a multimedia content description is distributed over multiple servers. In one embodiment, in order to support rapid and efficient transmission of multimedia work stored on multiple servers the encoder transmits the location of description fragments instead of transmitting the description fragments themselves to the decoder. The decoder can then directly retrieve the description fragments from other servers.

Figure 2:
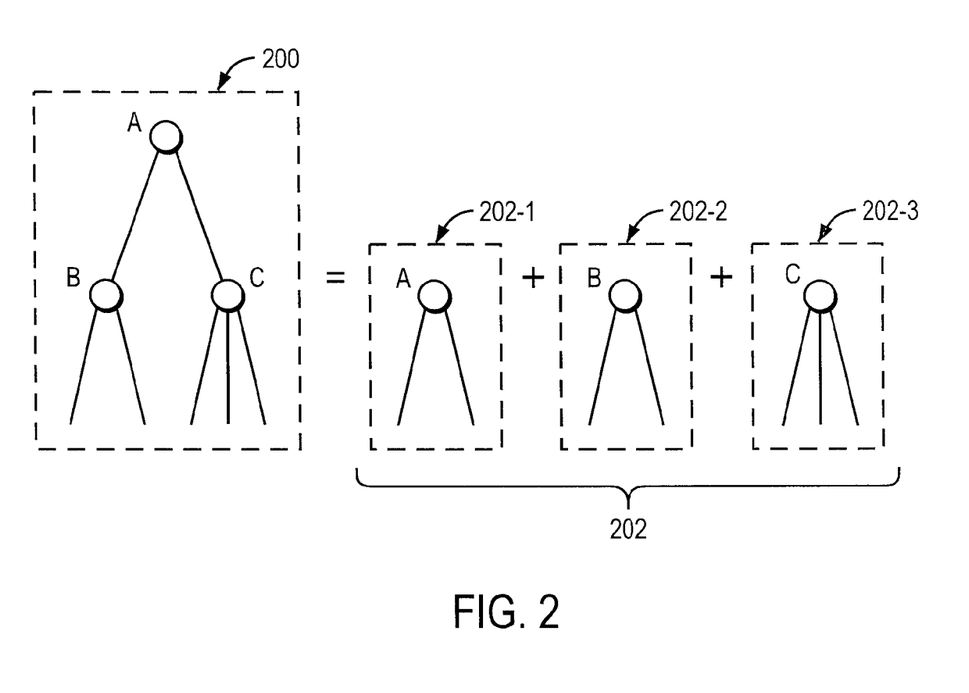
FIG. 2 illustrates an example of a content description tree and its fragments.

FIG. 2 illustrates an example of a content description tree and its fragments. Content description tree 200 represents a multimedia content description and is part of the data in instance document 112. The structure of the description is determined from the hierarchical structure of the XML elements and attributes used to represent the multimedia description. The details of this structure are specified in the DDL schema for the description. As shown in FIG. 2, a description can be divided into a set of fragments that can be "glued" back together to reconstruct the original description tree. For example, encoder 114 divides content description tree 200 into a set of fragments 202. Fragments 202 1-3 are subtrees of content description tree 200.

One method for transmitting a description is for the decoder to send it as a series of fragments, which are transmitted and received by the decoder, which then recombines them to reconstruct the complete description. Because each fragment 202 is sent separately, there must be information provided for each fragment 202 that identifies its location within content description tree 200. Fragments 202- 2 and 3 have information relating their position to fragment 202-1. Consequently, even though fragments 202 are sent separately, a corresponding decoder can reassemble fragments 202 into content description tree 200. The encoder does so by sending the fragment with its associated information as an access unit.

Figure 3:
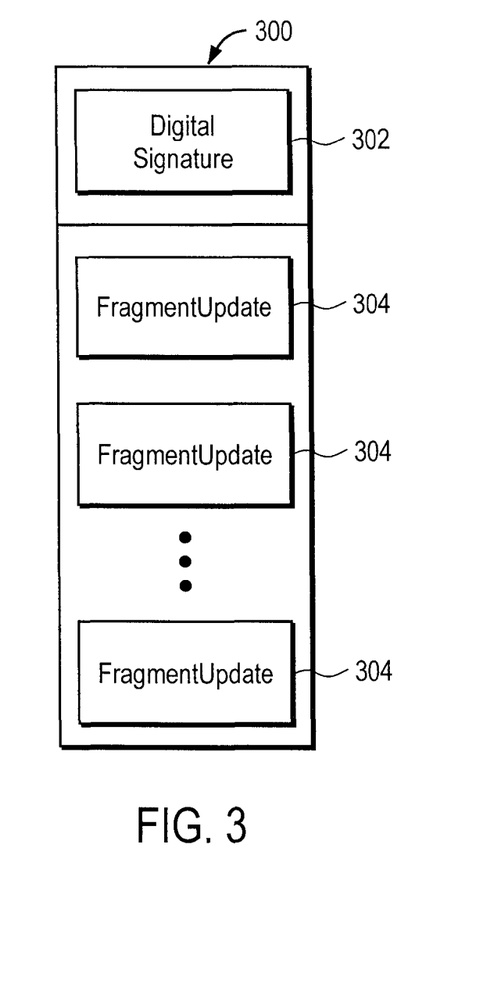
FIG. 3 illustrates an example of an access unit.

FIG. 3 is an example of an access unit. Henceforth, the abbreviation AU refers to an "access unit". Access unit 300 is composed of an optional digital signature 302 and one or more fragment updates 304. One embodiment of access unit 300 is an MPEG-7 system datatype to which timing information is attached. Access units typically do not carry the same timing information. The timing information is used for, in one example, to synchronize a transmitter (not shown) and a receiver (not shown) or to coordinate the delivery of the description with its associated multimedia content. In many communication protocols, the packets in the transport layer packets carry timing information, such as delivery times.

Figure 4:
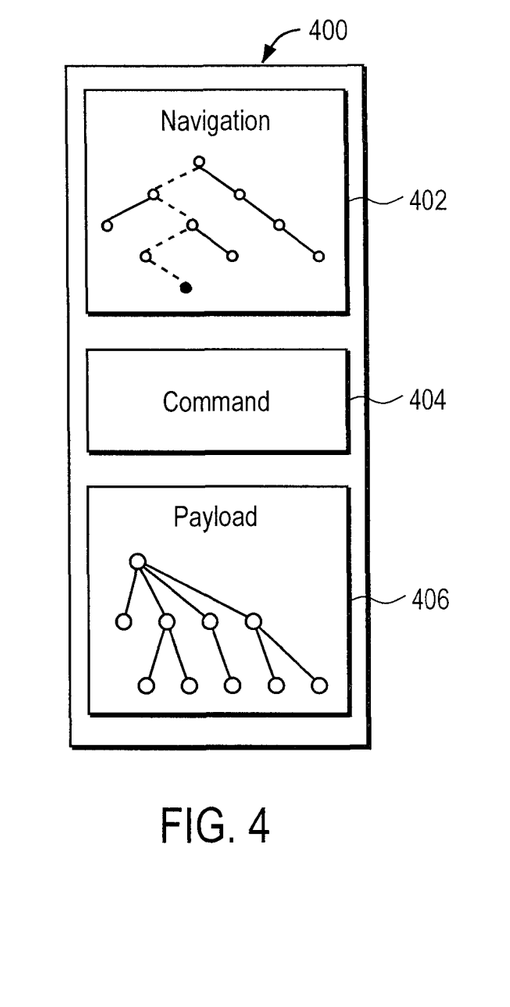
FIG. 4 illustrates an example of a fragment update.

FIG. 4 is one example of a fragment update. Fragment update 400 is composed of three parts. Navigation part 402 points to a location in content description tree 200 where update command 404 should execute. In other words, it specifies how to navigate to the node in the description where the command is to be applied. Update command 304 specifies the type of update to execute, for example to add, delete, or replace a fragment. Payload 406 provides the value of fragment 202 to be added or replaced but is not present when a delete command is sent.

The inclusion of an update command inside of an access unit allows an encoder to send either static or dynamic descriptions. When the description being transmitted is static, the encoder can divide the description into fragments, which will typically consists of add commands to build up the description. When the description is dynamic, an encoder can send a series one or more access units that contain update commands to effect any changes on the source description at the destination decoder.

Figure 5A:
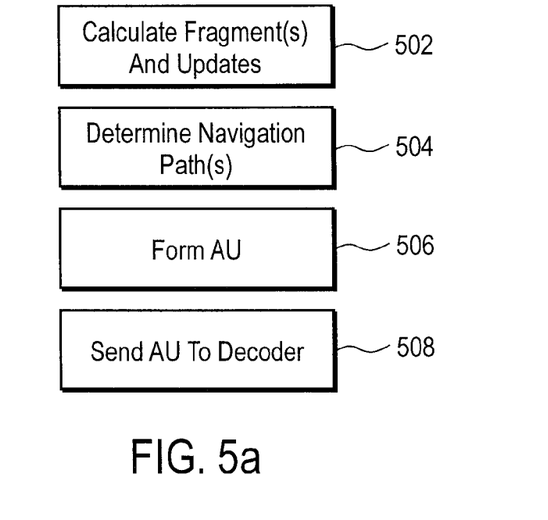
FIG. 5a is a flow diagram showing blocks, which when implemented by an encoder send an encoded data stream to decoder 510.

FIG. 5a is a flow diagram of blocks, which when implemented by an encoder and a decoder encode an access unit. In block 502 the decoder calculate the description tree fragments that need to be sent or updated. The process for doing this is encoder and application dependent and is not discussed here. In block 504 the decoder determines the navigation paths for the updated description. These are the paths to the root nodes of the description sub-trees that are to be updated. In block 506 the encoder gathers together all of the information needed to send the update and fragment in an access unit. For example, the decoder may represent the information in an access using an XML syntax discussed later or in a binary encoding. In block 508 the encoder sends the access unit information to the decoder in an encoded data stream.

Figure 5B:
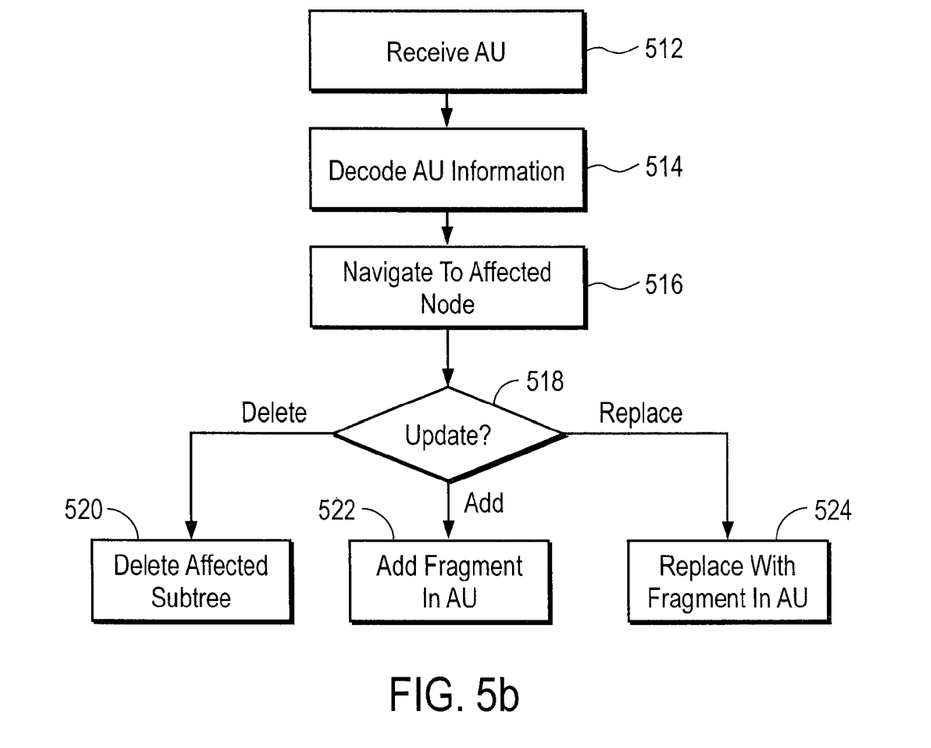
FIG. 5b is a flow diagram showing blocks, which when implemented by a decoder provide instance document 116 with both text and binary encoding.

FIG. 5b is a flow diagram of blocks, which when implemented by an encoder and a decoder decode an access unit. The decoder performs the processing depicted in FIG. 5b. In block 512 the decoder receives an access unit from the encoded data stream. In block 514 the information in the AU is decoded. For example, this may involve decoding a binary form of the access unit or parsing a textual XML representation of the access unit. In block 516, the navigation part is used to determine the affected node in the current description maintained by the decoder. In MPEG-7, for example, the navigation is expressed as an XPath expression that locates the root of the sub-tree that the decoder will update.

In block 518, complete the access units. Each access unit has a set of update commands and an indication of whether or not the access unit is applied serially or in parallel. In this block the update command is examined in order to determine which operation is specified: an add, delete, or replace command. If it is a delete command the sub-tree is deleted by the decoder in block 520. In block 522 the fragment in the update command is added to a designated node. In block 524 the designated fragment is replaced by the fragment value in the update command.

Figure 6:
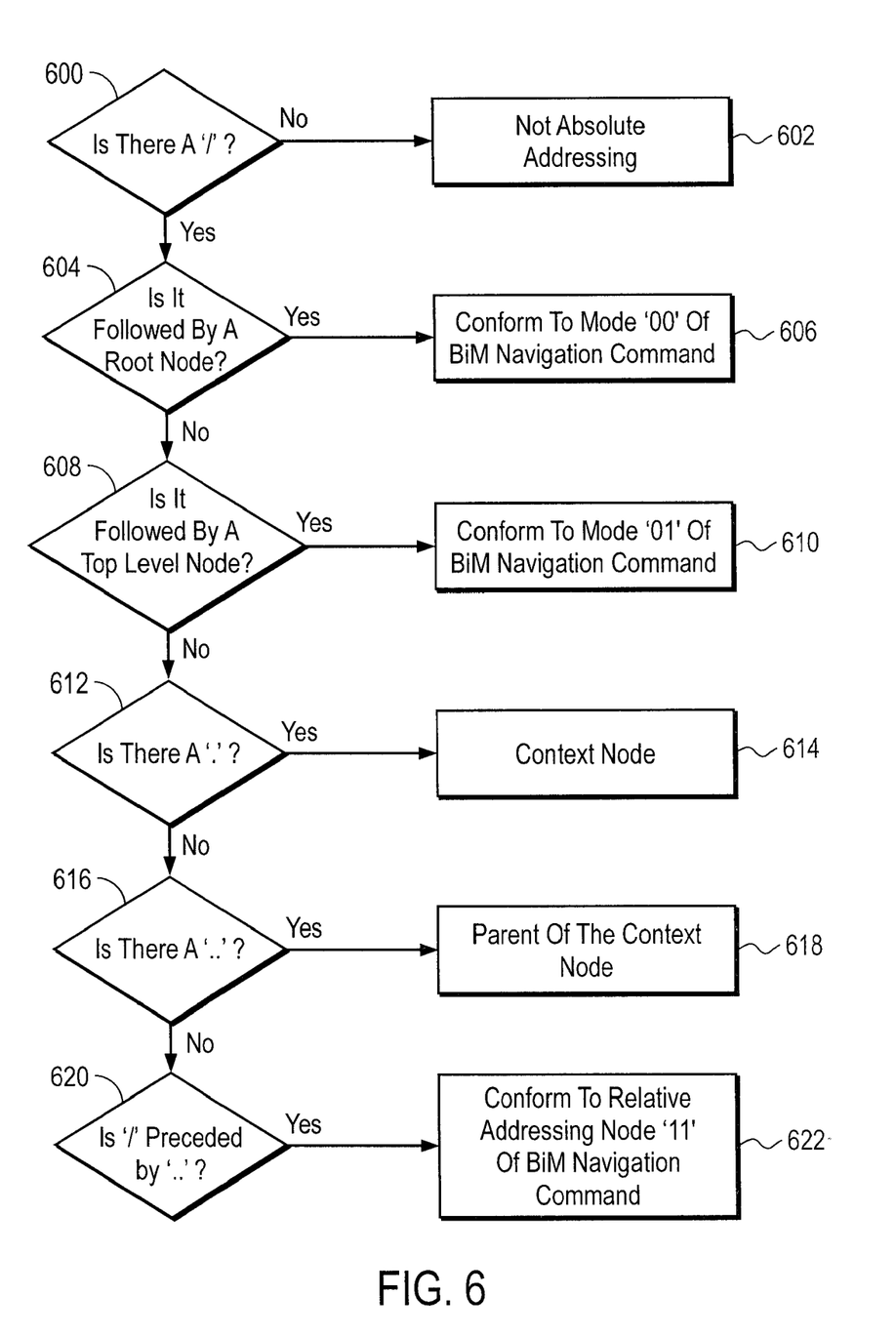
FIG. 6 is a flow diagram showing one embodiment of the changes made to BiM syntax.

FIG. 6 is a flow diagram showing one embodiment of block 516 when the navigation path is represented as an Xpath expression (or equivalent path representation). Determine if there is a '/', block 600. If there is no '/' then absolute addressing is not used, block 602.

Determine if the '/' is followed by a root node, block 604. If the '/' is followed by a root node then conform to mode '00' of BiM navigation command, block 606.

Determine if the '/' is followed by a top level node, step 608. If the '/' is followed by a top level node then conform to mode '01' of BiM navigation command, block 610.

Determine if there is a '.', block 612. If there is a '.' Then context node is indicated, block 614.

Determine if there is a '..', block 616. If there is a '..' then parent of a context node is indicated, block 618.

Determine if '/' is preceded by '..', block 620. If '/' is preceded by '..' then conform to relative addressing mode '11' of BiM navigation command, block 622.

In order to decode access units, a decoder needs an indication of where in an encoded data stream to begin decoding. Synchronization points are one example of points at which a decoder begins decoding and produces correct output. In one embodiment, a synchronization point is a random access point associated with a description fragment where a decoder can decode a part of the description and obtain a semantically correct portion of the description. As explain earlier, a semantically correct fragment is one that corresponds to a descriptor, description scheme, or datatype defined in the MPEG-7 schema.

One embodiment of a synchronization point is a reset. In one embodiment, a reset point is implemented using a "reset" update command. The access unit containing a reset command contains a fragment, or fragments, that form a complete description tree with respect to the schema. Such an access unit serves as a reset point for a decoder as it resets the state of the description decoding process. One example of a reset point is content description tree 200 in FIG. 2.

Yet another embodiment of a synchronization point is a fragment. Examples of fragments include fragments 202 1-3. A fragment is an arbitrarily connected component of the description tree that does not need to be complete with respect to any XML schema.

Figure 7:
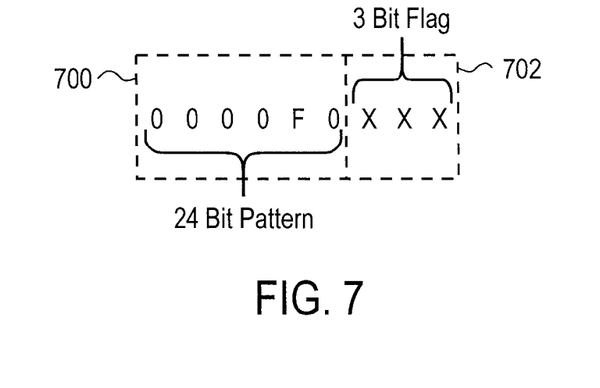
FIG. 7 illustrates one example of BiM syntax.

In the encoded data stream, a special sequence can be used to indicate the occurrence of a synchronization point. FIG. 7 illustrates one example of a synchronization code that is possible for MPEG-7 BiM syntax. The twenty-four bit pattern 700, followed by a three bit pattern 702 indicates that a synchronization point is present. Three-bit pattern 702 indicates MPEG7Unit or MPEG7Main. In order to indicate a fragment, modify three bit pattern 702 to reflect signaling of a fragment.

In one embodiment, signal synchronization points at the AU level by defining an attribute for MPEG7_AccessUnit called "sync_point," enumerating the three possibilities.

Figure 8:
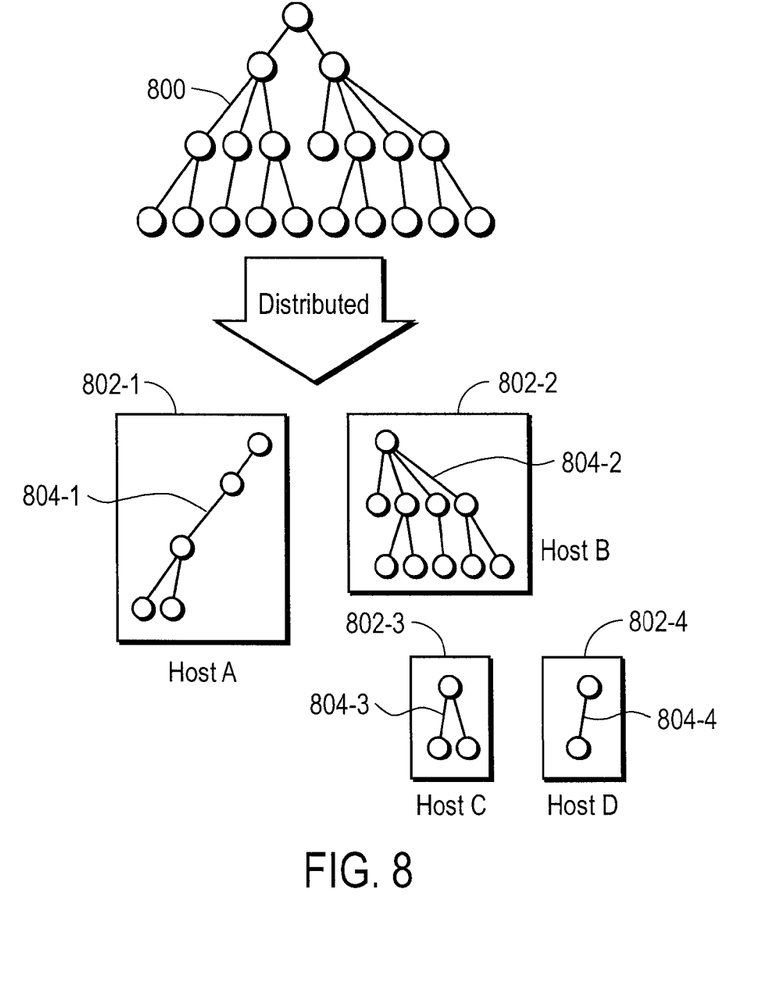
FIG. 8 illustrates an example of a distributed MPEG-7 description.

FIG. 8 illustrates a distributed MPEG-7 description. Content description tree 800 is distributed among hosts 802. Host 802-1 stores fragment 804-1, host 802-2 stores fragment 804-2, host 802-3 stores fragment 804-3, and host 802-4 stores fragment 804-4. In the prior art, in order to transmit content description tree 800, all fragments are transmitted from a single encoder.

Rather than transmit all the fragments values in an access unit, a single host, for example host 802-3 with description data in fragment 804-3, transmits fragment 804-3 with pointers, or fragment references, to audio description data in fragment 804-1 and video description data in fragment 804-2.

Figure 9:
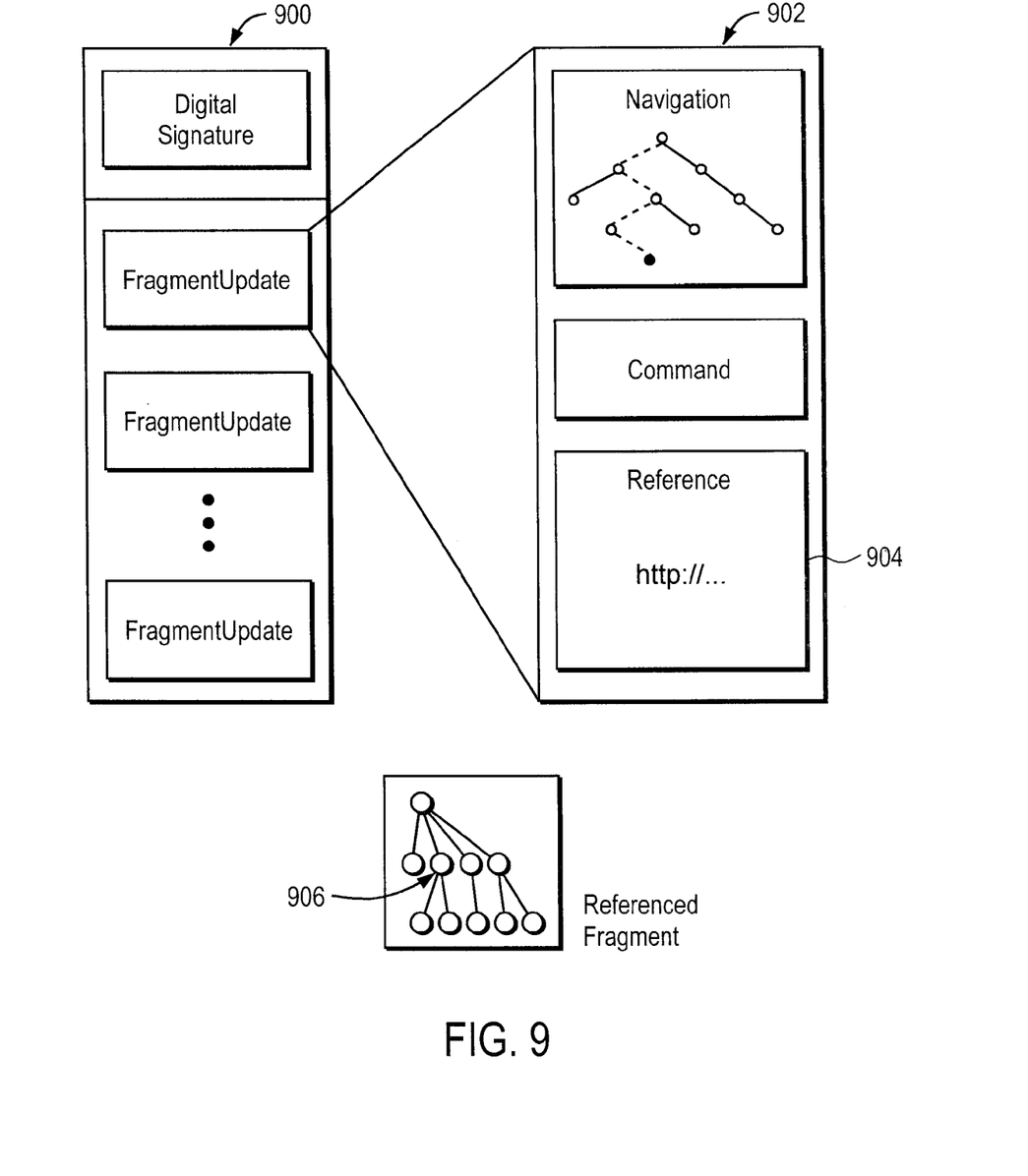
FIG. 9 illustrates one example of a fragment reference.

FIG. 9 illustrates one possible implementation of a fragment reference with access units, which is an extension and modification of the implementation of access units illustrated in FIG. 3. Access unit 900 contains fragment update 902. Rather than a payload in fragment update 902, as would be found in the prior embodiments, the invention shows fragment reference 904. Fragment reference 904 is a reference that identifies an accessible resource containing the fragment.

In one embodiment, any resource designated by a uniform resource identifier (URI) can be available as the source for a fragment value. For example, a URI of the form "http:// . . . " indicates Hypertext transfer Protocol (HTTP) form of a URI and points to referenced fragment 906. In one example, the source is a node identified in some MPEG-7 description, though the source is not necessarily in the same description document as the description document being transmitted.

In another embodiment, the reference is to a previously sent node that is used as a fragment value. This allows transmission of identical subtrees. The reference is typically in XPath.

In another embodiment the reference is to a node in the current description tree. In one example the reference uses an XML IDREF.

Any resource that represents an MPEG-7 description whose type is appropriate for the fragment value can be referenced. In one embodiment the referenced fragment comes from the same description tree as the one being transmitted. In another embodiment the referenced fragment comes from a different description tree as the one being transmitted. Fragment reference 904 preferably resolves to a node that is the root of a description reference.

There are several embodiments in which a decoder (not shown) accesses the referenced fragment. In one embodiment the decoder receives the referenced fragment through an MPEG-7 transmission system whereby the fragment is transmitted as a partial description using access units.

In another embodiment the decoder stores fragment values. The decoder compares referenced fragments to stored fragments and if a referenced fragment is stored then the decoder obtains the fragment from storage; otherwise, the decoder retrieves the fragment from the referenced location.

In another embodiment the decoder uses an HTML address to access an XML document from a network (not shown).

In another embodiment the decoder accesses fragment references only when needed, rather than when first received. Such an embodiment allows the decoder to have greater control over the timing and reception of description data. For example, if the decoder does not need a particular fragment reference, it may never access and retrieve that fragment reference.

A fragment that is referenced may have links that point to nodes outside of the set of nodes inside the fragment's sub-tree. When a fragment is referenced the decoder must determine how such links are to be correctly resolved.

Internal links point to nodes inside the same document as the fragment. An internal link can lose its meaning if the fragment is removed from the original document. An external link is points to a node in another document. One example of external links are links implemented in XML by a URI reference. External pointers within a fragment do not change their meaning if they are removed from the original document.

Figure 10:
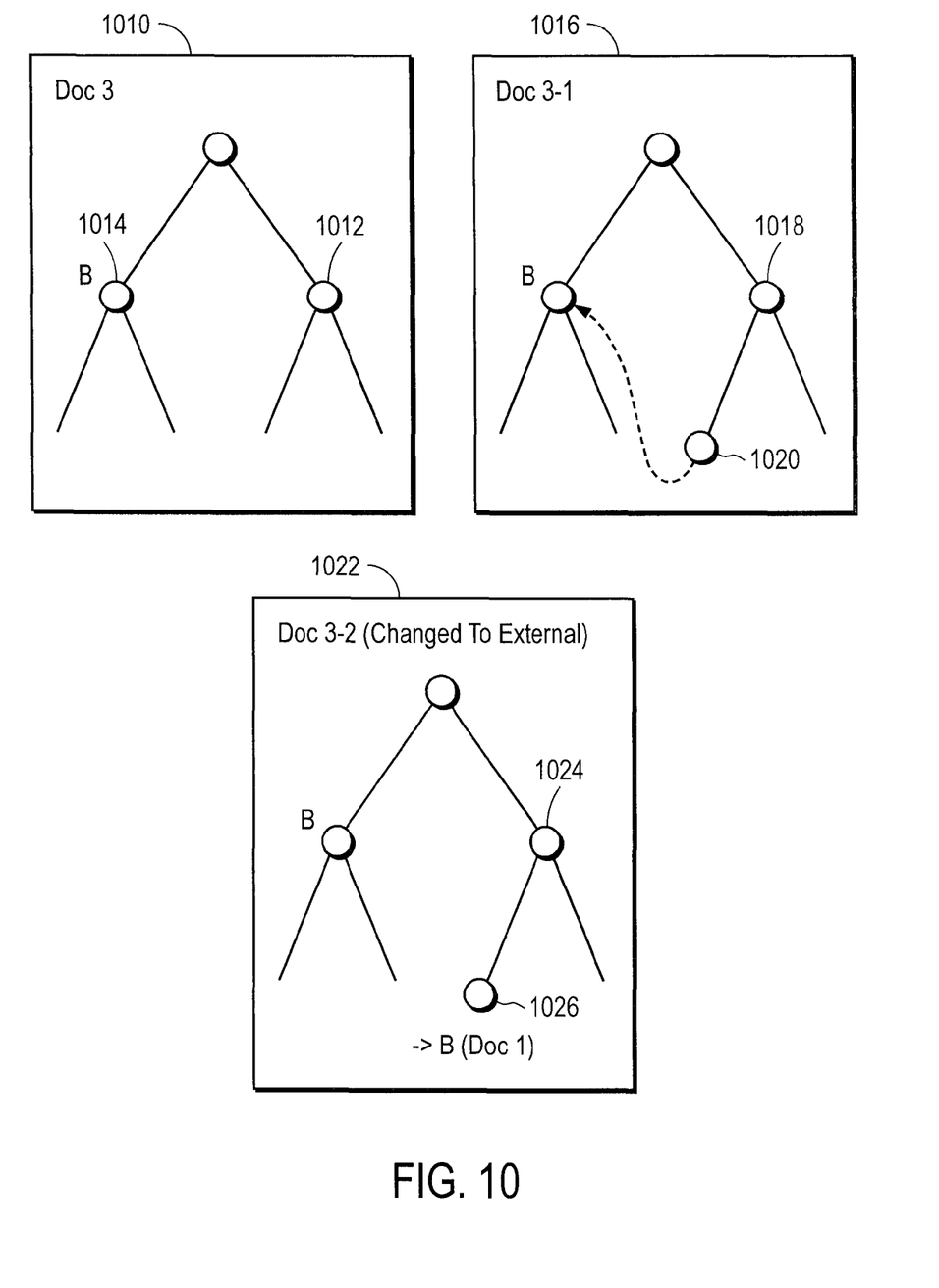
FIG. 10 illustrates one example of internal and external pointers.

FIG. 10 illustrates one example of internal and external links. Doc 1000 has node 1002 with an internal pointer to node 1004. Nodes 1002 and 1004 have identifiers unique to doc 1000, for example nodes "a" and "b", respectively. Node 1002 references node identified as "b", which is node 1004.

Suppose that a decoder references a fragment sub-tree rooted at node 1002 in Doc 1 and another fragment 1008 in Doc 2. Further suppose that a the sub-tree rooted at node 1012 in Doc 1010 is to be replaced with a fragment that is referenced, or a referenced fragment.

If the update for fragment 1002 is applied to document 1010 then the result is shown as document 1016. Note that in the updated sub-tree 1018 the internal link shown at node 1020 points to the node B in document 3 rather than the original target of the internal link, which was node 1004 in document 1.

In another embodiment, when fragment 1008 is used to update node 1012 of document 1010 the result is illustrated as document 1022. The updated sub-tree at node 1024 still points to the node B in document 1010 as in the original document 1006.

In another embodiment, node 1002 is translated into an external link to node 1004 (node 'B' of doc 1).

In yet another embodiment, within a fragment update an encoder encodes a fragment reference with a binary encoding format and a command with a text-based encoding format.

In yet another embodiment, a fragment update comprises both a payload and a fragment reference.

Referencing fragments makes, in one embodiment, distributing MPEG-7 description data at the system level transparent to the description itself. Fragment references enable distribution of large descriptions across multiple servers.

Referencing fragments also allows sharing and replicating description references that are used in multiple descriptions.

Transmission size is compressed if there are common references within a description tree. An encoder transmits a reference once and then sends a pointer to that reference in subsequent access units.

In one embodiment the DDL definition for decoder configuration information, named DecoderConfig here is:

```
<element name= "DecoderConfig" type= "mpeg7:DecoderConfigType"/>
<complexType name= "DecoderConfigType">
    <choice>
        <element name= "Predefined">
            <simpleType>
                <restriction base= "positiveInteger">
                    <minInclusive value= "1"/>
                    <maxInclusive value= "255">
                </restriction>
            </simpleType>
```

-continued

```
    </element>
    <element name= "SchemaReference" type= "uriReference"
        minOccurs= "1" maxOccurs= "unbounded"/>
</choice>
<element ref= "MPEG7_AccessUnit" minOccurs= "0" maxOccurs= "1"/>
<element ref= "Profile" minOccurs= "0" maxOccurs= "1"/>
</complexType>
```

Predefined indicates whether or not to use a predefined configuration. In one embodiment a list of uniform resource identifiers (URIs) follows. In another embodiment the number of URIs is zero and a well-known set of schemas is used instead. SchemaReference is an URI to reference the schema. AccessUnit provides the 'reset' and initial state description, supplied inline, that forms the basis of the reset and initial states.

In one embodiment, the DDL representation definition for an access unit, called MPEG7_AccessUnit here, is:

```
<complexType name="MPEG7_AccessUnit">
    <element name ="update" type="updateCommand" minOccurs="1"
        maxOccurs="unbounded"/>
    <attribute name="executionOrder">
        <simpleType base="string">
            <enumeration value="sequential"/>
            <enumeration value="parallel"/>
        </simpleType>
    </attribute>
</complexType>
<complexType name="updateCommand">
    <element name="command" type="updateType"/>
    <element name="location" type="updateLocation"/>
    <element name="value" type="updateValue"/>
</complexType/>
<simpleType name="updateType" base="string">
    <enumeration value="add"/>
    <enumeration value="delete"/>
    <enumeration value="change"/>
    <enumeration value="reset"/>
</simpleType>
<complexType name="updateLocation">
    <attribute name="fragmentID" type="uriReference"/>
    <attribute name="position" type="boolean" use="default" value="1"/>
</complexType>
<complexType name="updateValue" minOccurs="0" maxOccurs "1">
    <choice>
        <element name="binaryValue" type="binaryUpdate"/>
        <element name="textualValue" type="textualUpdate"/>
        <element ref"resetContentDescription"/>
    </choice>
    <attribute name="schemaIndex" type="integer"/>
</complexType>
<simpleType name="listOfByte" base="Byte" derivedBy="list">
<complexType name="VectorB" base="listOfByte"
derivedBy="extension">
    <attribute ref ="mpeg7:dim"/>
</complexType>
<complexType name="binaryValue">
    <element name="value" type="VectorB"/>
    <! Using "NOTATION" will point to which decoder to use for nonXML
content.
    and it is optional.>
    <attribute name="binaryType" type="NOTATION" use="optional"/>
</complexType>
<complexType name="textualValue">
    <any namespace="##other" minOccurs="1" maxOccurs="unbounded"
        processContent="skip"/>
    </complexType
```

UpdateType indicates the type of update command used, for example add, delete, change and reset. In one embodiment updateType is update command 404. In one embodiment the reset command replaces the whole content description tree with a predefined or referenced content description tree. updateLocation uses a subset of the Xpath language to indicate where the update command executes. In one embodiment updateLocation is navigation part 402. In one embodiment there is a flag indicating whether an addition occurs before or after the identified location. updateValue indicates the value to be added or replaced. In one embodiment updateValue is payload 406. In one embodiment the update value is specified either as a binary or textual value using the binaryValue or textualValue datatypes respectively.

In another embodiment, DDL representation syntax for a textually-encoded access unit is:

```
<element name="AccessUnit" type="mpeg7:AccessUnitType/>
<complexType name="AccessUnitType">
    <sequence>
        <element name="FragmentRef" type="mpeg7:FragmentUpdateType"
            minOccurs="0" maxOccurs="unbounded"/>
    </sequence>
    <attribute name="Order" use="optional"/>
        <simpleType>
            <restriction base= "string">
                <enumeration value= "seq"/>
                <enumeration value= "par"/>
            </restriction>
        </SimpleType>
    </attribute>
    <attribute name= "auID" type= "NcName">
</complexType>
```

In one embodiment a fragment reference associates the sub-tree included in the same AU with its child sub-tree included in another AU. In another embodiment a fragment update is used for dynamic building up a content description tree. In one embodiment order is used to signal as to whether the update order should be preserved between a sequence of FragmentUpdates.

In another embodiment, DDL representation syntax for the syntax for accessing units allows either fragments or fragment references as follows:

```
<complexType name="FragmentPayloadType">
    <complexContent>
        <choice>
            <element name="Payload" type="mpeg7:Mpeg7RootType"/>
            <element name="Reference" type="mpeg7:ReferenceType"/>
        </choice>
        <attribute name="PartialInstantiation" type="boolean"
            use="default" value="false"/>
    </complexContent>
</complexType>
```

Payload contains the value of a description fragment to be updated. Reference contains a URI reference to fragment that can be used as the source for the value of the update. PartialInstantiation is an attribute used to signal that one or several elements of the fragment have empty content. Payload contains an MPEG-7 root unit, which is either a complete description or a single descriptor or description instance.

In one embodiment, ConnectionPoint indicates a node of the sub-tree to which a child sub-tree should be connected. In one embodiment FragmentLocation indicates a child sub-tree included in another AU.

Figure 11:
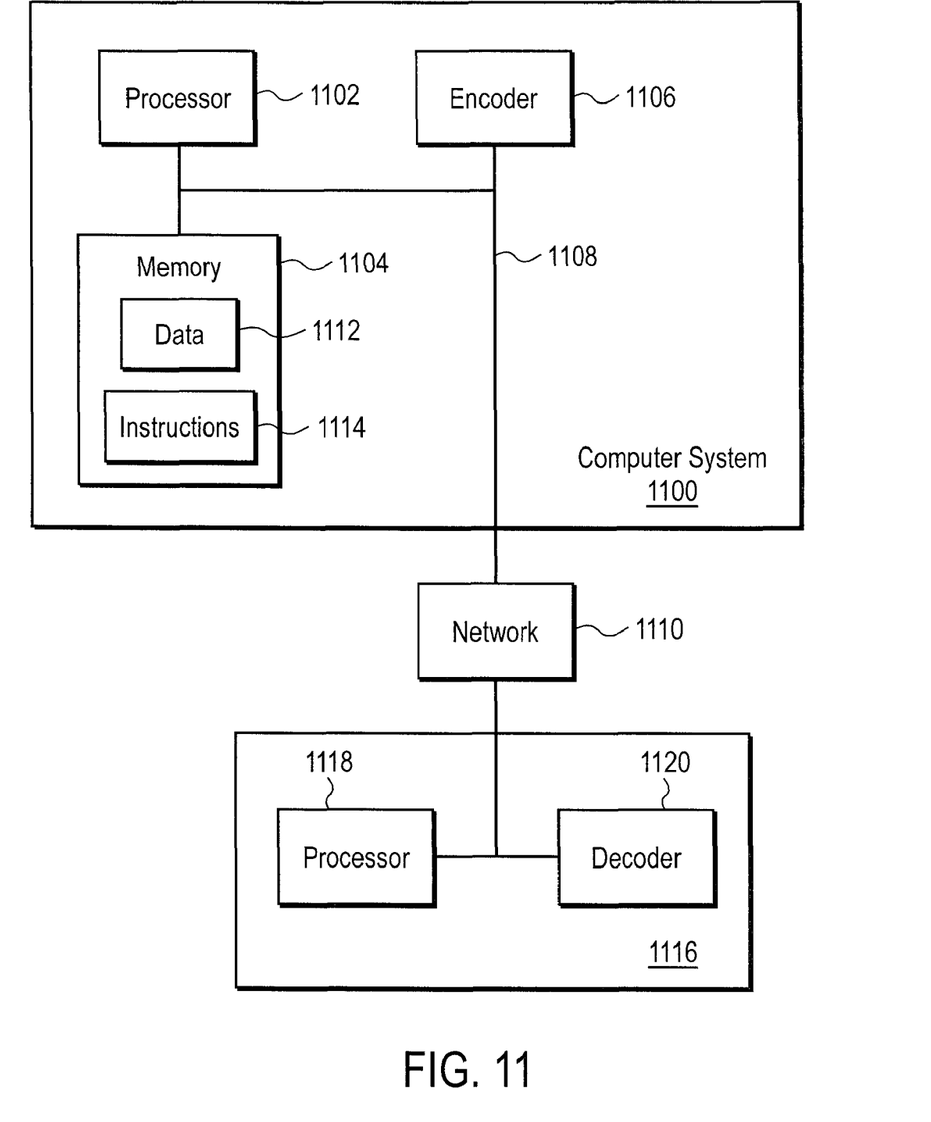
FIG. 11 illustrates one example of a computer system that implements the principles of the invention.

FIG. 11 illustrates an embodiment of computer system 1100 that implements the principles of the invention. System 1100 includes a stand-alone or portable computing device. Computer system comprises processor 1102, storage device 1104, and MPEG encoder 1106, all coupled together with interconnect 1108, such as a bus or a point-to-point pointer. In addition, a number of user input/output devices (not shown) couple to system 1100.

Processor 1102 represents a central processing unit of any type of architecture (e.g., Intel architecture or Sun Microsystems architecture), or hybrid architecture. In addition, processor 1102 could be implemented in one or more chips. Storage device 1104 represents one or more mechanisms for storing data such as content description trees or fragments. Storage device 1104 represents read-only memory (ROM), random access memory (RAM), magnetic disk storage media, optical storage media, flash memory devices, and/or other machine-readable media. Interconnect 1108 represents one or more buses (e.g., accelerated graphics port bus, peripheral component interconnect bus, industry standard architecture bus, X-Bus, video electronics standards association related to buses, etc.) and bridges (also termed bus controllers).

While this embodiment is described in relation to a single processor computer system, the invention could be implemented in a multi-processor computer system. In addition to other devices, one or more networks 1110 may be present. Network 1110 represents one or more network connections for transmitting data over a machine-readable media. The invention could also be implemented on multiple computers connected via such a network.

Storage device 1104 has stored therein data 1112 and program instructions 1114 (e.g., software, computer programs, etc.). Data 1112 represents data stored in one or more of the formats described herein. Program instructions 1114 represent the necessary code for performing any and/or all of the techniques described with reference to FIGS. 2-10. It will be recognized by one of ordinary skill in the art that storage device 1104 preferably contains additional software (not shown), which is not necessary to understanding the invention.

System 1100 also includes encoder 1106 coupled to processor 1102 and storage device 1104. Encoder 1106 is not necessarily based in hardware, it may also be stored as instructions 1114 in storage device 1104 and executed by processor 1102. Encoder 1106 is used for encoding control signals and/or microcode entry points sent by processor 1102. In response to these control signals and/or microcode entry points, encoder 1106 encodes the control signals so that they may be transmitted across network 1110 to system 1116 where processor 1118 and decoder 1120 will perform the appropriate operations.

The particular methods of the invention have been described in terms of computer software with reference to a series of flow diagrams. The methods to be performed by a computer constitute computer programs made up of computer-executable instructions illustrated as blocks (acts). Describing the methods by reference to a flow diagram enables one skilled in the art to develop such programs including such instructions to carry out the methods on suitably configured computers (the processing unit of the computer executing the instructions from computer-readable media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result. It will be appreciated that more or fewer processes may be incorporated into the methods as described above without departing from the scope of the invention, and that no particular order is implied by the arrangement of blocks shown and described herein.

In the foregoing specification, the invention is described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

It is also important to note that while the embodiments described here have referred to MPEG-7 descriptions, the principles of this invention apply to delivering any XML document from an encoder to a decoder over a communication channel.

What is claimed is:

1. A computerized method comprising:
   forming an access unit corresponding to a fragment of a multimedia description, the access unit being a network transmission data structure comprising a fragment update, the fragment update comprising a fragment update command that specifies a type of command for execution by a decoder to update the multimedia description; and
   forming an encoded data stream from the access unit.

2. The method of claim 1 wherein the fragment update command is selected from the group consisting of add, delete, change, and reset commands.

3. The method of claim 1 wherein the fragment update further comprises a value.

4. The method of claim 1 wherein the fragment update further comprises a fragment reference wherein the fragment reference is a pointer to a fragment to be used by the fragment update command.

5. The method of claim 4 wherein the fragment reference is a uniform resource identifier (URI).

6. The method of claim 4 wherein the fragment reference is in XPath.

7. The method of claim 1 wherein the fragment update further comprises a payload.

8. The method of claim 4 wherein the fragment is in a first node.

9. The method of claim 8 wherein the fragment reference is in a second node and the first node and the second node are the same node.

10. The method of claim 9 wherein the first node and the second node are in a Moving Picture Experts Group (MPEG) multimedia description.

11. The method of claim 8 wherein the fragment reference is in a second node and the first node and the second node are different nodes.

12. The method of claim 11 wherein the first node and the second node are in a Moving Picture Experts Group (MPEG) multimedia description.

13. The method of claim 1 further comprising:
   determining if a multimedia description corresponding to the access unit has changed;
   identifying a changed portion of the multimedia description and a corresponding access unit; and forming the fragment update to correspond to the changed portion of the multimedia description.

14. The method of claim 1 further comprising:
associating the access unit with a partial description.

15. The method of claim 14 wherein the partial description comprises an instance of a descriptor.

16. The method of claim 1 further comprising:
associating the access unit with a reset point that contains a fragment that forms a complete description.

17. The method of claim 4 wherein the fragment is stored on a different system than a system performing the method of claim 1.

18. The method of claim 1 wherein the access unit corresponds to a description, and further comprising:
transmitting the encoded data stream while the description is static.

19. The method of claim 1 wherein the access unit corresponds to a description, and further comprising:
transmitting the encoded data stream while the description is dynamic.

20. The method of claim 1 further comprising:
transmitting a data for decoding to a decoder.

21. The method of claim 20 wherein the data include schemas defining a description data to be transmitted.

22. A computerized method comprising:
receiving an access unit corresponding to a fragment of a multimedia description, the access unit being a network transmission data structure comprising a fragment update, wherein the fragment update comprises a command and a first fragment reference, and wherein the first fragment reference is a pointer to a first referenced fragment in a first node, and the command specifies a type of command for execution by a decoder to update the multimedia description.

23. The method of claim 22 wherein the first referenced fragment is a partial description.

24. The method of claim 22 further comprising: comparing the first referenced fragment to a stored fragment; and obtaining the stored fragment if the stored fragment is the first referenced fragment.

25. The method of claim 22 wherein the first fragment reference is in hyper-text transfer protocol (HTTP).

26. The method of claim 22 wherein the access unit is a part of a Moving Picture Expert Group (MPEG) multimedia description.

27. The method of claim 22 further comprising:
identifying a second node which the command affects; and
identifying a second fragment reference which the first fragment reference points to, wherein the second fragment reference points to the first referenced fragment.

28. The method of claim 22 wherein the fragment update further comprises a payload.

29. The method of claim 27, wherein the second fragment reference points to a second referenced fragment within the first node, further comprising:
replacing the first fragment reference with a third fragment reference pointing to the second referenced fragment.

30. The method of claim 27, wherein the second fragment reference points to a second referenced fragment within the first node, further comprising:
replacing the first fragment reference with a third fragment reference pointing to a third referenced fragment within the second node.

31. A non-transitory computer-readable medium having executable instructions to cause a computer to perform a method comprising:

forming an access unit corresponding to a fragment of a multimedia description, the access unit being a network transmission data structure comprising a fragment update, the fragment update comprising a fragment update command that specifies a type of command for execution by a decoder to update the multimedia description; and
forming an encoded data stream from the access unit.

32. The non-transitory computer-readable medium of claim 31, wherein the fragment update command is selected from the group consisting of add, delete, change, and reset commands.

33. The non-transitory computer-readable medium of claim 31, wherein the fragment update further comprises a value.

34. The non-transitory computer-readable medium of claim 31, wherein the fragment update command further comprises a fragment reference, and wherein the fragment reference is a pointer to a fragment to be used by the fragment update command.

35. The non-transitory computer-readable medium of claim 34, wherein the fragment reference is a uniform resource identifier (URI).

36. The non-transitory computer-readable medium of claim 34, wherein the fragment reference is in XPath.

37. The non-transitory computer-readable medium of claim 34, wherein the fragment is stored on a different computer.

38. The non-transitory computer-readable medium of claim 34, wherein the fragment is in a first node.

39. The non-transitory computer-readable medium of claim 38, wherein the fragment reference is in a second node and the first node and the second node are the same node.

40. The non-transitory computer-readable medium of claim 39, wherein the first node and the second node are in a Moving Picture Experts Group (MPEG) multimedia description.

41. The non-transitory computer-readable medium of claim 38, wherein the fragment reference is in a second node and the first node and the second node are different nodes.

42. The non-transitory computer-readable medium of claim 41, wherein the first node and the second node are in a Moving Picture Experts Group (MPEG) multimedia description.

43. The non-transitory computer-readable medium of claim 31, wherein the fragment update further comprises a payload.

44. The non-transitory computer-readable medium of claim 31, wherein the method further comprises:
determining if a multimedia description corresponding to the access unit has changed;
identifying a changed portion of the multimedia description and a corresponding access unit; and
forming the fragment update to correspond to the changed portion of the multimedia description.

45. The non-transitory computer-readable medium of claim 31, wherein the method further comprises:
associating the access unit with a partial description.

46. The non-transitory computer-readable medium of claim 45, wherein the partial description comprises an instance of a descriptor.

47. The non-transitory computer-readable medium of claim 31, wherein the method further comprises:
associating the access unit with a reset point that contains a fragment that forms a complete description.

48. The non-transitory computer-readable medium of claim 31, wherein the access unit corresponds to a description, and the method further comprises:
    transmitting the encoded data stream while the description is static.

49. The non-transitory computer-readable medium of claim 31, wherein the access unit corresponds to a description, and the method further comprises:
    transmitting the encoded data stream while the description is dynamic.

50. The non-transitory computer-readable medium of claim 31, wherein the method further comprises:
    transmitting a data for decoding to a decoder.

51. The non-transitory computer-readable medium of claim 50, wherein the data include schemas defining a description data to be transmitted.

52. A non-transitory computer-readable medium having executable instruction to cause a computer to perform a method comprising:
    receiving an access unit corresponding to a fragment of a multimedia description, the access unit being a network transmission data structure comprising a fragment update, wherein the fragment update comprises a command and a first fragment reference, and wherein the first fragment reference is a pointer to a first referenced fragment in a first node and the command specifies a type of command for execution by a decoder to update the multimedia description.

53. The non-transitory computer-readable medium of claim 52, wherein the first referenced fragment is a partial description.

54. The non-transitory computer-readable medium of claim 52, wherein the method further comprises:
    comparing the first referenced fragment to a stored fragment; and obtaining the stored fragment if the stored fragment is the first referenced fragment.

55. The non-transitory computer-readable medium of claim 52, wherein the first fragment reference is in hyper-text transfer protocol (HTTP).

56. The non-transitory computer-readable medium of claim 52, wherein the access unit is a part of a Moving Picture Expert Group (MPEG) multimedia description.

57. The non-transitory computer-readable medium of claim 52, wherein the method further comprises:
    identifying a second node which the command affects; and
    identifying a second fragment reference which the first fragment reference points to, wherein the second fragment reference points to the first referenced fragment.

58. The non-transitory computer-readable medium of claim 57, wherein the second fragment reference points to a second referenced fragment within the first node, and the method further comprises:
    replacing the first fragment reference with a third fragment reference pointing to the second referenced fragment.

59. The non-transitory computer-readable medium of claim 57, wherein the second fragment reference points to a second referenced fragment within the first node, and the method further comprises:
    replacing the first fragment reference with a third fragment reference pointing to a third referenced fragment within the second node.

60. The non-transitory computer-readable medium of claim 52, wherein the fragment update further comprises a payload.

61. A system comprising:
    a processor coupled to a memory through a system bus; and
    a encode process executed by the processor from the memory to cause the processor to form an access unit corresponding to a fragment of a multimedia description and form an encoded data stream from the access unit, the access unit being a transmission data structure comprising a fragment update, and the fragment update comprising a fragment update command that specifies a type of command for execution by a decoder to update the multimedia description.

62. The system of claim 61, wherein the fragment update command is selected from the group consisting of add, delete, change, and reset commands.

63. The system of claim 61, wherein the fragment update further comprises a value.

64. The system of claim 61, wherein the fragment update further comprises a fragment reference wherein the fragment reference is a pointer to a fragment to be used by the fragment update command.

65. The system of claim 61, wherein the fragment reference is a uniform resource identifier (URI).

66. The system of claim 61, wherein the fragment reference is in XPath (extensible markup language path language).

67. The system of claim 64, wherein the fragment is stored on a different system.

68. The system of claim 64, wherein the fragment is in a first node.

69. The system of claim 68, wherein the fragment reference is in a second node and the first node and the second node are the same node.

70. The system of claim 69, wherein the first node and the second node are in a Moving Picture Experts Group (MPEG) multimedia description.

71. The system of claim 68, wherein the fragment reference is in a second node and the first node and the second node are different nodes.

72. The system of claim 71, wherein the first node and the second node are in a Moving Picture Experts Group (MPEG) multimedia description.

73. The system of claim 61, wherein the fragment update further comprises a payload.

74. The system of claim 61, wherein the encode process further causes the processor to determine if a multimedia description corresponding to the access unit has changed, identify a changed portion of the multimedia description and a corresponding access unit, and form the fragment update to correspond to the changed portion of the multimedia description.

75. The system of claim 61, wherein the encode process further causes the processor to associate the access unit with a partial description.

76. The system of claim 75, wherein the partial description comprises an instance of a descriptor.

77. The system of claim 61, wherein the encode process further causes the processor to associate the access unit with a reset point that contains a fragment that forms a complete description.

78. The system of claim 61, wherein the access unit corresponds to a description, and the encode process further causes the processor to transmit the encoded data stream through a network interface coupled to the processor through the system bus while the description is static.

79. The system of claim 61, wherein the access unit corresponds to a description, and the encode process further causes the processor to transmit the encoded data stream through a network interface coupled to the processor through the system bus while the description is dynamic.

80. The system of claim 61, wherein the encode process further causes the processor to transmit a data for decoding to a decode process through a network interface coupled to the processor through the system bus.

81. The system of claim 80, wherein the data include schemas defining a description data to be transmitted.

82. A system comprising:
a processor coupled to a memory through a system bus; and
a decode process executed by the processor from the memory to cause the processor to receive an access unit corresponding to a fragment of a multimedia description, the access unit being a network transmission data structure comprising a fragment update, wherein the fragment update comprises a command and a first fragment reference, and wherein the first fragment reference is a pointer to a first referenced fragment in a first node, and the command specifies a type of command for execution by the processor to update the multimedia description.

83. The system of claim 82, wherein the first referenced fragment is a partial description.

84. The system of claim 82, wherein the decode process further causes the processor to compare the first referenced fragment to a stored fragment, and obtain the stored fragment if the stored fragment is the first referenced fragment.

85. The system of claim 82, wherein the first fragment reference is in hyper-text transfer protocol (HTTP).

86. The system of claim 82, wherein the access unit is a part of a Moving Picture Expert Group (MPEG) multimedia description.

87. The system of claim 82, wherein the decode process further causes the processor to identify a second node which the command affects, and identify a second fragment reference which the first fragment reference points to, wherein the second fragment reference points to the first referenced fragment.

88. The system of claim 87, wherein the second fragment reference points to a second referenced fragment within the first node, and the decode process further causes the processor to replace the first fragment reference with a third fragment reference pointing to the second referenced fragment.

89. The system of claim 87, wherein the second fragment reference points to a second referenced fragment within the first node, and the decode process further causes the processor to replace the first fragment reference with a third fragment reference pointing to a third referenced fragment within the second node.

90. The system of claim 82, wherein the fragment update further comprises a payload.

* * * * *